United States Patent [19]

Hinderaker et al.

[11] Patent Number: 4,747,529
[45] Date of Patent: May 31, 1988

[54] COLLAPSIBLE SKI RACK

[76] Inventors: Philip D. Hinderaker; Daniel J. Hinderaker, both of P.O. Box 33427, 2501 Hudson Rd., St. Paul, Minn. 55133-3427

[21] Appl. No.: 887,347
[22] Filed: Jul. 21, 1986
[51] Int. Cl.⁴ .................................................. B60R 9/00
[52] U.S. Cl. .................................. 224/325; 224/314; 211/70.5; 248/302
[58] Field of Search .............. 224/309, 310, 311, 314, 224/315, 316, 317, 318, 319, 320, 321, 322, 323, 324, 325, 326, 327; 269/906, 43; 211/70.5; 248/302

[56] References Cited

U.S. PATENT DOCUMENTS

| | | | |
|---|---|---|---|
| 2,778,588 | 1/1957 | Capocci | 248/302 |
| 3,836,058 | 9/1974 | Penniman et al. | 224/41.1 F |
| 4,048,700 | 9/1977 | Browne | 224/318 X |
| 4,341,375 | 7/1982 | Romanin | 269/906 X |

FOREIGN PATENT DOCUMENTS 2078642 1/1982 United Kingdom .............. 224/314

Primary Examiner—Henry J. Recla
Assistant Examiner—David Voorhees
Attorney, Agent, or Firm—William B. Barte

[57] ABSTRACT

A collapsible rack for use with skis or other elongated articles, comprising a pair of units adapted to be mounted spaced apart, such as on the roof of a car, each unit having a hinged assembly which when vertically upright, allows the skis to be positioned therein, and which when pivoted toward a horizontal position wedges against the skis to secure them therein.

18 Claims, 3 Drawing Sheets

COLLAPSIBLE SKI RACK

FIELD OF THE INVENTION

The present invention relates to racks adapted to be mounted on the top of objects such as vehicles to carry objects such as skis and other elongated articles therein.

BACKGROUND OF THE INVENTION

Numerous types of roof-mounted racks for carrying skis and the like have been devised in the past, all having various advantages and disadvantages, including initial cost of the rack itself, the ease with which the rack can be secured to and removed from the vehicle, the relative ease with which skis can be secured in the rack, the number of skis readily mounted therein, etc. In the past, a common type of rack included a pair of assemblies adapted to be secured across the vehicle, one near the front and the other near the rear of the top. Each assembly typically included a lower elongated member and an upper elongated member hinged to the lower member so as to pinch and thereby secure skis positioned horizontally therebetween. Such assemblies generally included means for locking the top and bottom member together to prevent the skis from sliding out, and rubber gaskets or other resilient cushioning means on the surfaces facing the skis to more firmly grasp and prevent marring the ski surface.

While such racks have enjoyed considerable popularity, difficulties in mounting skis therein, the limited number of skis that can be mounted in the racks, and the considerable wind resistance and vibration encountered when skis were mounted therein have been recognized. Such limitations have to some extent been avoided by a newer style rack having a plurality of vertically positioned parts between which, one or more skis, typically a pair of skis with the bottoms facing each other, may be positioned on edge. For example, one such rack is depicted in U.S. Pat. No. 3,836,058. The opposed ski pairs thus support each other, tending to prevent undesirable vibration due to air flow, and the opposing camber causes each ski to bear against one of the vertical posts, enhancing the firmness with which the skis are held in place. Typically, as exemplarily depicted in the '058 patent, such racks also include a lockable mechanism for moving opposing pairs of the posts toward each other to firmly engage pairs of skis therebetween. While such racks are fairly popular, they are also relatively expensive; relatively complex, and are apt to become difficult to operate due to ice and snow being jammed in the mechanisms; and present significant wind resistance.

SUMMARY OF THE INVENTION

In contrast to such prior art racks, the rack of the present invention is both inexpensive, very easily positioned on the top of a vehicle and very rapidly receives and secures one or more pairs of skis in place via movable members so simple that interference due to snow or ice is extremely unlikely.

For ease in understanding the construction of the present invention and the manner in which it is primarily contemplated to be used, the present description extensively uses the relative terms "horizontal" and "vertical", such as by reference to the top of a vehicle as being a substantially horizontal surface. Thus, the rack of the present invention may be described as having certain substantially horizontally or vertically disposed members which are only so disposed when the rack is positioned so as to be placed on a horizontal surface. It is also expected that the rack of the present invention may also be used on more vertically disposed surfaces such as the side or rear of a vehicle, etc.

The rack of the present invention thus comprises at least a pair of units adapted to be positioned spaced apart from each other and to cooperatively receive an elongated article extending therebetween. Each unit of the pair includes a base and a means for securing the base to a substantially horizontal surface, such as the top of a vehicle. In the simplest form, one of the units is adapted to be secured on one side of and near the front of the top or roof of the vehicle, while the second unit is adapted to be secured on the same side of, but spaced from and to the rear of the first unit, toward the rear of the top of the vehicle, the units thus being positioned to receive an elongated article therebetween.

Each of the bases has an assembly horizontally pivotally mounted thereon for receiving and securing therein such an article. Each assembly comprises a horizontally positioned member secured to the respective base to allow the member to pivot about a horizontal axis. That member, in turn, has connected thereto at least one leg extending substantially normal therefrom. Preferably, the horizontal member and leg are formed of a single metal rod bent at right angles, and where two such legs are desired within each assembly, the structure may be substantially U-shaped. Each leg also has secured thereto at least an upper and lower support member which are spaced apart for receiving and supporting an article therebetween when the leg is in a substantially vertical position. Alternately, when the assembly and hence the leg is pivoted into a more horizontal position, the support members wedge the article therebetween to prevent vertical movement of the article. Finally, the assembly includes an appendage on the end of at least one of the support members for restricting horizontal movement of an article when the leg is pivoted into the horizontal position. A single metal rod may preferably be bent to form the respective support members and appendages, and may be welded to the respective legs. When an elongated article is then positioned between the two units, the wedging and restricting actions thus act in concert to secure the article.

The above noted wedging action results from the ingenious utilization of the angular change between the legs and base as the assembly pivots from the vertical position at which the articles are received, to the more nearly horizontal position at which the effective vertical space between the upper and lower support members is decreased. The wedging force results from leverage between the horizontal pivot member which functions as the fulcrum of the lever and the respective support members. The weight of the articles, such as skis, supply the wedging force, and the rack self-adjusts to accommodate variable width articles ranging from narrower skis or the like to wide skis or the like.

Such a basic assembly can readily be extended to provide for a multiplicity of articles. Thus, for example, as noted above, two legs may be provided in each unit to form a U-shaped assembly, with each leg being further bent to form the upper support member and being further bent to provide a horizontal movement restricting appendage. In such an embodiment, the lower support member is preferably a second rod extending parallel to the horizontal pivot member and is welded to the two legs a distance below the upper support member to allow appropriately dimensioned articles, such as the width of skis, to be positioned therebetween.

Also, to enable ready mounting of the rack of the present invention to a magnetically responsive surface such as the roof of a typical vehicle, permanent magnet means are provided for securing the base to such a surface. More conventional means, such as suction cups and straps may also be used. In such a magnetically implemented embodiment, the base may comprise a steel plate having a tubular channel or similar construction secured to the top surface thereof, within which the pivotable member of the ski-holding assembly is mounted. A rubber-bonded permanent magnet sheet is secured to the bottom surface of the steel plate to magnetically attach the rack to the magnetically responsive surface of the vehicle.

DETAILED DESCRIPTION OF THE INVENTION

Figure 1:
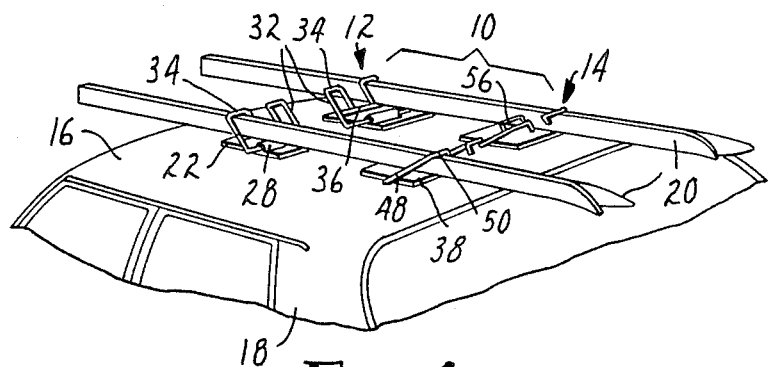
FIG. 1 is a perspective view of one embodiment of the rack of the present invention mounted on the roof of a vehicle.

In a preferred embodiment, the rack of the present invention is adapted to be secured to the top of a vehicle, automobile or the like. FIG. 1 shows a perspective view of one such an embodiment, in which are shown two separate racks 10 each of which includes a pair of separate units 12 and 14, each of which is adapted to be secured to the top 16 of an object such as a vehicle 18, spaced apart and one behind the other, thus receiving and supporting an elongated article such as a pair of skis 20 therebetween. Each pair of units shown in FIG. 1 is intended to receive two pair of skis (only one pair is shown in each unit) and to be preferably positioned toward one side of the vehicle roof, thus allowing convenient access.

Figure 2:
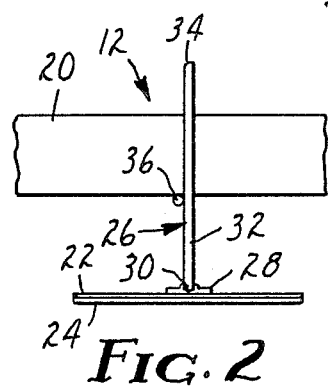
FIGS. 2 and 3 are side views of a pair units constituting one of the two complete racks shown in FIG. 1, depicted in the vertical, or open position.
Figure 3:
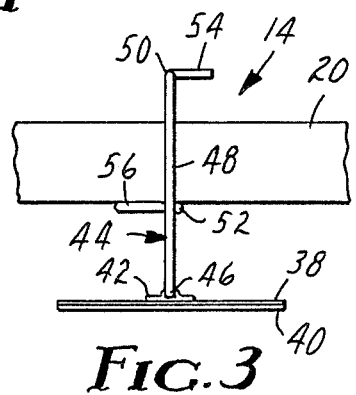

FIGS. 2 and 3 show side views of the units 12 and 14 respectively, in which the units are in an upright, open position, allowing the skis to be readily inserted. As described in more detail hereinafter, the unit 12 includes a base 22 and a means 24 for securing the base to a substantially flat surface such as the roof of a vehicle. Preferably, the base 22 is a square section of magnetically soft steel, and the securing means 24 is a similarly dimensioned sheet of polymer bonded permanent magnet material, such as the Plastiform Brand magnet material manufactured by Minnesota Mining and Manufacturing Company.

The unit 12 further includes an assembly 26 pivotally mounted on the base by a clip 28 welded to the base 22. The assembly 26 in turn comprises a horizontally positioned member 30 which extends through the clip 28 to allow the assembly to pivot about a horizontal axis parallel with the base. A pair of parallel legs, one of which 32 is visible in FIG. 2, are secured to opposite ends of the member 30, and parallel, spaced apart upper and lower support members, or arms 34 and 36 respectively are in turn secured between the legs 32, thus forming a rectangular opening into which the straight end of the skis may be inserted. The assembly is thus constructed such that the width between the vertical legs 32 is somewhat greater than the thickness of a pair of skis positioned bottom to bottom, the opposing camber of the skis thus tending to compress the skis slightly as they are inserted into the opening. Similarly, the height or space between the upper and lower support arms 34 and 36 is designed to be significantly greater than the width of the widest of skis to be used therewith, thus allowing the assembly 12 to be pivoted into the position shown in FIG. 1 as discussed in greater detail hereinafter.

The other unit 14 is shown in FIG. 3 to be considerably similar to the unit 12, but to differ considerably as well. The unit 14 is seen to include a similar base 38, securing means 40, and clip 42 within which is pivotally secured an assembly 44. Also, the assembly 44 includes a similarly horizontally positioned member 46 which extends through the clip 42 to allow the assembly 44 to pivot, and a pair of parallel legs, one of which 48 is visible. Differing from those included in the unit 12, however, are the upper and lower support members or arms 50 and 52, respectively. Thus as shown more clearly in FIG. 1 and subsequent figures, upper support arms 50 extend from each leg toward the other, terminating short of each other to allow the skis to be lowered therebetween. Each upper support arm also includes a member 54 which extends at right angles to the inwardly directed support arms.

The lower support arm 52 extends between the legs 48 and includes a member 56 which extends parallel to but in the opposite direction to that of the upper arm member 54. A with the unit 12, the respective legs 48, upper and lower support members 50 and 52, and upper and lower members 54 and 56 are dimensioned to slightly compress a pair of skis therebetween and to allow the assembly to pivot into a more nearly horizontal, or closed position.

Figure 4:
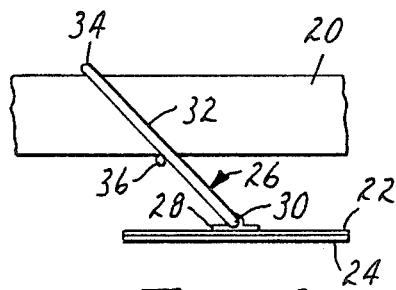
FIGS. 4 and 5 are side views corresponding to the views of FIGS. 2 and 3, but wherein each unit is depicted in a more nearly horizontal, or closed position.
Figure 5:
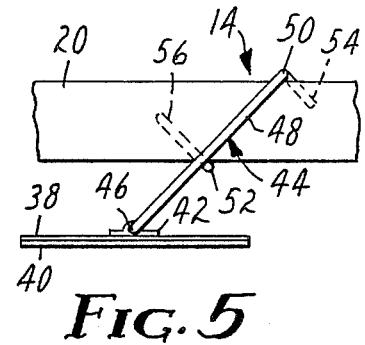

Such a closed position for the units 12 and 14 is shown both in FIG. 1 and in side view in FIGS. 4 and 5 respectively. In FIG. 4 may be seen the manner by which pivoting the assembly 26 decreases the effective vertical space between the arms 34 and 36, thus restricting vertical movement of the skis. Likewise, in FIG. 5 may be seen the manner by which pivoting of the assembly 44 decreases the effective vertical space between the arms 50 and 52. As this assembly is pivoted to a more horizontal position, the upper and lower members, 54 and 56 respectively, assume more nearly vertical positions and thus prevent the skis from moving horizontally, inward. Any outward horizontal movement is prevented by the skis pressing against the outer leg 48. Any upward movement of the skis is resisted by gravitational forces acting directly on the skis as well as by a biasing means to be described later. Furthermore, as the assemblies are preferably pivoted in opposite directions, any upward movement of the skis such as due to bouncing of the vehicle results in an opposing force on the opposite assembly which damps any tendency for either assembly to rise, or to allow the skis to bounce or slide lengthwise.

Figures 6, 6A:
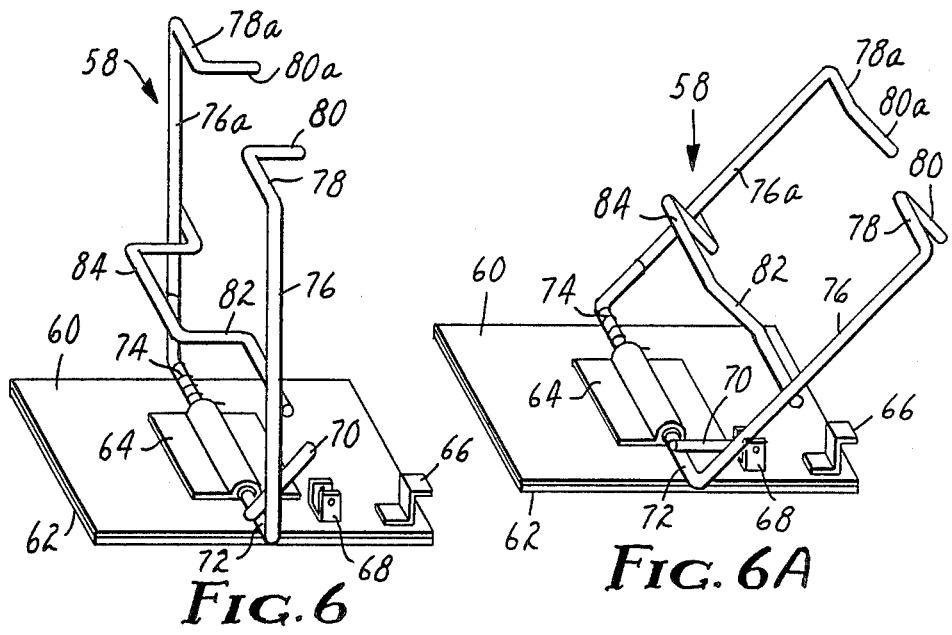
FIGS. 6 and 6A are perspective views of a preferred unit in an open and closed position respectively, having open ends allowing skis to be inserted from the top.

FIGS. 6 and 6A more clearly show the construction of the pivoting assembly of a unit similar to that of the unit 14 previously described. The unit 58 shown in FIGS. 6 and 6A includes a base 60, permanent magnet securing means 62 and mounting clip 64 as in the earlier embodiment. Here, the base 60 has additionally welded thereto a handle 66 positioned near one corner of the base and a U-shaped bracket 68 positioned to receive an extension 70, secured to the horizontal member 72. The handle 66 is desired in order to slightly lift one corner of the base, thereby gradually lessening the magnetic attractive forces between the magnetic securing means 62 and a metal automobile roof, to enable ready removal of the unit. The bracket 68 has matching holes for receiving a padlock to secure the extension 70 therebelow, thereby locking the assembly in the closed position.

The horizontal member 72 of the pivoting assembly is shaped with outer portions slightly offset from the center portion which extends through the clip 64. When the assembly is in the upright, or open position, the offset portions are positioned slightly over center, and thereby resist the downward pivoting action, and maintain the assembly in the upright position to facilitate inserting the skis. Also, a coil spring 74 is desirably included to bear against at least one of the legs, thus biasing the assembly toward the horizontal, or closed position to more firmly secure the skis therein. The two parallel legs 76 and 76a, respectively, terminate with the inwardly facing upper support arms 78 and 78a and extensions 80 and 80a, while the lower support arm 82 is a U-shaped member, welded to the opposite legs.

Upon pivoting the assembly to the closed position as shown in FIG. 6A, the center portion 84 of the lower support arm 82 and the oppositely directed extensions 80 and 80a, bear against the skis, wedging them against the respective legs 76 and 76a, while the upper and lower arms 78 and 82 enclose and prevent vertical movement.

It may also be recognized that the entire assembly may be simply and inexpensively constructed of bent and welded steel rod, the horizontal member 72, legs 76, 76a, arms 78, 78a and extensions 80, 80a being formed of a single rod, with the arm 82 and extension 70 simply being welded thereto. Such an assembly may further be dip-coated in plastisol, vinyl or the like to provide a flexible rubbery coating which further protects and grips the skis to prevent slippage.

Figures 7, 7A:
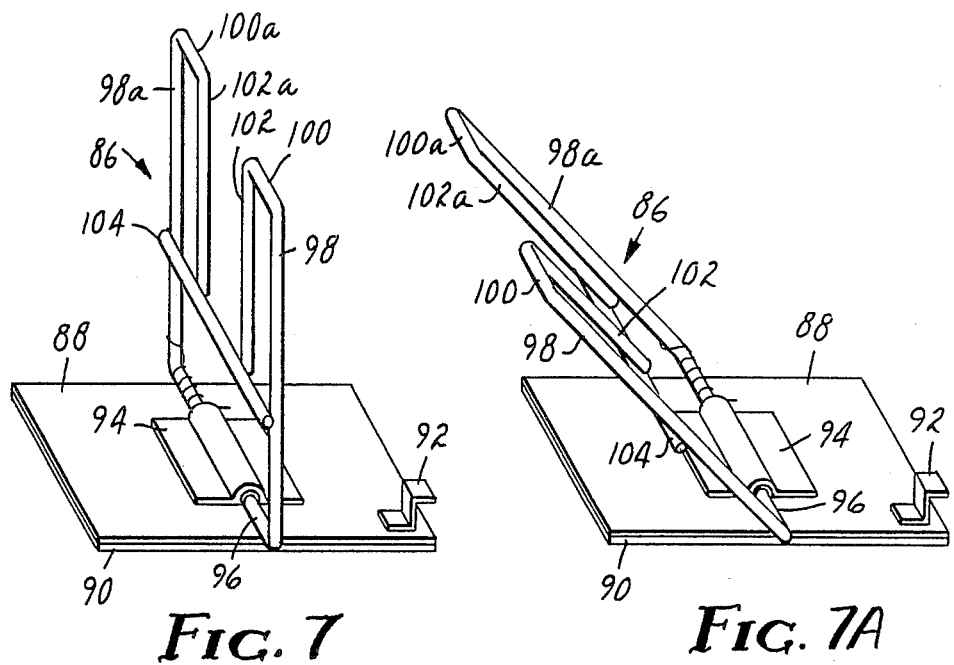
FIGS. 7 and 7A are perspective open and closed views of a matching preferred unit to that shown in FIGS. 6 and 6A having closed loops into which skis may be slid.

Similar perspective views of a matching unit 86 corresponding to the unit 12 of FIGS. 1, 2 and 4 are set forth in FIGS. 7 and 7A. Like the unit 58 of FIG. 6 and 6A, the unit 86 includes a base 88, securing magnet sheet 90, removal handle 92 and mounting clip 94. Preferably, the horizontal mounting member 96, which extends through the clip 94, is also slightly offset to provide a force keeping the assembly in an upright position. The member is preferably formed of a single rod, symmetrically bent to form the two outer legs 98, 98a, the upper support arms 100, 100a, and the inner legs 102, 102a. The lower support arm 104 is simply welded across all four legs. If desired, the unit may also include a locking bracket, bias spring, etc. as shown in FIGS. 6 and 6A.

Figure 8:
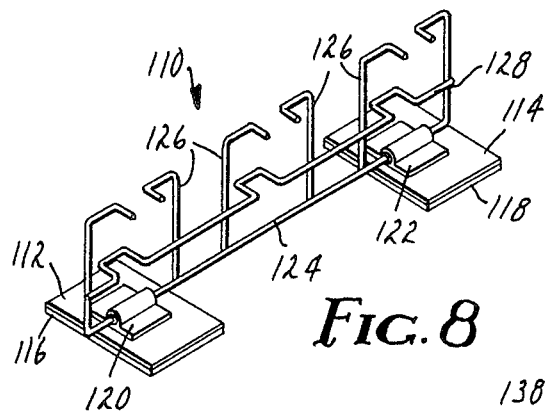
FIG. 8 is a perspective view of another embodiment of a unit having a pair of bases and members extending therebetween to receive a larger number of skis.

In another embodiment shown in FIG. 8 adapted to receive and secure a greater number of pairs of skis, one of the pair of units 110 comprises two magnetically soft steel base members 112 and 114, together with magnet sheets 116 and 118, and mounting clips 120 and 122. An assembly is pivotally mounted in the clips via a horizontal member 124 which extends between and through the clips. That member may be crimped outside each clip to prevent it from sliding sideways. The assembly further comprises as many legs 126 as are desired, each of which terminates as shown in FIGS. 6 and 6A to form the upper support arms and extensions. The lower support arm 128 is then shaped to provide the horizontal movement preventing center portions and is welded to the respective legs. The matching unit corresponding to the unit 110 of FIG. 8 is not shown, but similarly includes a pair of bases and a plurality of legs and arms like that shown in FIGS. 7 and 7A.

Figure 9:
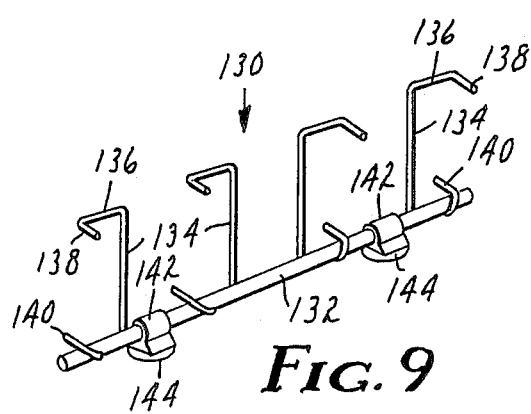
FIG. 9 is a perspective view of another embodiment of a unit having a pair of bases and a tubular frame extending therebetween and pivotally mounted thereon.

In another embodiment shown in FIG. 9, each unit 130 may be formed of a tubular horizontal member 132 such as a light weight steel pipe, to which are welded a plurality of steel rods which form the legs 134, upper support arms 136 and horizontal movement preventing extensions 138, similar in construction to that described in FIGS. 6 and 6A. In this embodiment, the pipe 132 itself functions as the lower support member and is rotated to close the openings and wedge the skis. As shown in the front view of FIG. 10, each of the rods is bent in a partial spiral to encircle the pipe, thereby forming the legs 136, etc. on one end and forming a lower horizontal movement preventing member 140. The matching units for receiving the straight ends of the skis, similar to those shown in FIGS. 7 and 7A, would similarly be formed of a pipe, to which is welded a bent rod assembly similar to that of FIG. 9, but with closed ends as in FIG. 7.

In this embodiment, the magnet securing sheets of the previous embodiment are also shown to be replaced by more conventional bases 142 to which inexpensive suction cups 144, securing straps (not shown) and the like may be attached.

Figure 10:
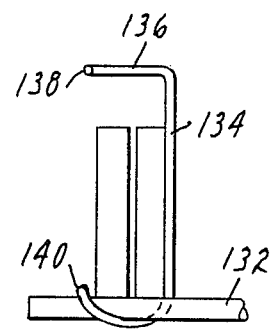
FIG. 10 is a partial front view of an open-ended assembly for a unit corresponding to that shown in FIG. 9.
Figure 11A:
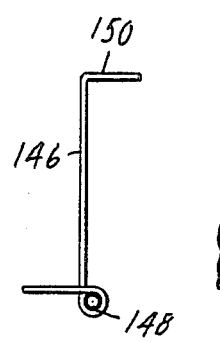
FIGS. 11A, 11B and 11C are side views of the embodiment of FIG. 10, shown in open (FIG. 11A), and in closed positions securing skis of different widths (FIGS. 11B and 11C).
Figure 11B:
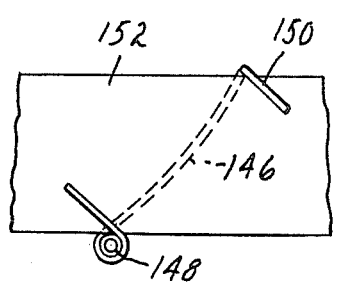
Figure 11C:
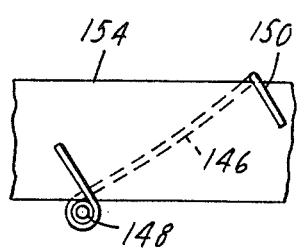

In a preferred embodiment, the metal rods bent to form the legs and respective support arms and restraining members may be desirably formed of spring steel or the like. Thus, as shown in FIGS. 11A, 11B and 11C, a rod 146 bent to provide the legs and respective members shown in FIGS. 9 and 10 is welded to a pipe 148. The length of the leg 146 between the pipe (i.e., lower support member) and the upper support arm 150 is dimensioned to accommodate a variety of widths of skis, even when all are mounted side by side. Thus, as shown in first closed position of FIG. 11B, the leg 146 is bent upward due to the presence of a wider ski 152, whereas in FIG. 11C, the leg 146 is further biased toward the horizontal to secure a narrower ski 154.

In the embodiment described hereinabove, each assembly of the racks is desirably dimensioned to encompass a pair of skis ranging in width from 1.75" (45 mm) to 3.5" (89 mm) and a combined thickness when firmly pressed together of 1.5 inches. Accordingly, the width between the opposite parallel legs is desirably about 1.5 inches, while the distance between the upper and lower support arms is 4 inches. Such a construction is desirably formed of steel rod about 0.25" (6 mm) thick, bent to the desired shape, welded together and dip coated with vinyl or the like.

To provide appropriate attraction to typical automobile roofs, it is desirable to provide a magnetically soft steel base approximately 0.018" thick low carbon cold rolled steel at least six inches square to which is bonded a like dimensioned sheet of polymer bonded permanent magnet material. To maximize the holding power of such a sheet, it is desirably magnetized to provide rows of alternating polarity poles, with about 4–8 poles per inch.

While in the various embodiments described above, the racks have been described in a shape to receive pairs of skis positioned side by side, with the edges vertical, it is also within the scope of the present invention to dimension the racks to receive either single or pairs of skis with the surface positioned horizontal.

We claim:

1. A car-top mountable rack for holding an elongated article such as a pair of skis, comprising at least a pair of units adapted to be positioned spaced apart from each other to cooperatively receive a said article, each unit including
   (a) a substantially planar base,
   (b) means for securing each said base to a substantially horizontal surface such as the top of a vehicle; and
   (c) means horizontally pivotally mounted on said base for receiving and securing therein a said article, comprising:
      (i) a horizontally positioned member secured to said base to allow said member to pivot about a horizontal axis,
      (ii) at least a pair of spaced apart, parallel legs both mounted to the member and extending substantially normal thereto,
      (iii) at least upper and lower spaced apart support members secured to said legs and extending substantially parallel to said axis, said support members thereby defining spaced apart arms for allowing one end of a said article to be slid into the opening created by said combined arms and legs, thereby receiving and supporting a said article when said legs are in a substantially vertical position and for wedging the article therebetween when the legs are pivoted into a more nearly horizontal position to prevent vertical movement of said article, and
      (iv) means on the end of at least one of said support members for restricting horizontal movement of a said article when said leg is so pivoted, said wedging and restricting action thereby in concert securing a said elongated article within said two spaced apart units of said rack.

2. A rack according to claim 1, wherein said base securing means comprises a permanent magnet assembly secured to said base and adapted to be magnetically attracted to a magnetic structure such as the top of a vehicle.

3. A rack according to claim 2, wherein said magnet assembly comprises a ferromagnetic backing plate and a rubber-bonded permanent magnet sheet bonded to said backing plate and magnetized to provide a plurality of alternating polarity magnetic poles, said alternating polarity poles and backing plate thereby concentrating the external magnetic flux on the side of the magnet sheet opposite to said backing plate and enhancing the holding force to a said magnetic structure.

4. A rack according to claim 1, further comprising means for biasing said pivotally mounted means toward said base.

5. A rack according to claim 4, wherein said biasing means comprises a spring member bearing against said base and loaded against said pivotally mounted means to cause it to pivot toward said base.

6. A rack according to claim 1, further comprising means for maintaining said pivotally mounted means in said vertical position to facilitate inserting a said article therein.

7. A rack according to claim 1, further comprising means for locking said pivotally mounted means in said horizontal position to prevent unauthorized removal of a said article secured therein.

8. A rack according to claim 1, wherein each unit comprises a pair of spaced apart bases adapted to be secured at separate locations on opposite sides of a said surface, such as extending across the width of the top of a vehicle, and wherein said pivotally mounted means extends between said pair of bases and includes a plurality of parallel legs and associated support members for securing a plurality of articles therein, such as several pairs of skis.

9. A rack according to claim 1, wherein said pivotably mounted means, legs and upper and lower support members are formed of metal rods bent and welded together to form a rigid and light weight assembly.

10. A rack according to claim 1, wherein at least one of said leg and upper support members are formed of spring steel to allow said members to flex when biased toward a said article to thereby adjust for a variety of widths when a plurality of articles are received and secured therein.

11. A rack according to claim 1, wherein the lower support member is a tubular member to which are fastened a plurality of upper support members preferably formed of spring steel to allow said members to flex when biased toward a said article and thereby adjust to a variety of widths where a plurality of articles are received and then wedged in the closed position.

12. A rack acccording to claim 1, wherein said horizontally positioned member and said lower support member are combined as a metal tube to which are secured a plurality of metal rods configured to form said legs, upper support member and horizontal movement restricting means.

13. A rack according to claim 12, wherein said metal rods are formed of spring steel, thereby allowing said members to flex when biased toward a said article and to automatically adjust to simultaneously accommodate a variety of different width articles received and secured within the assembly rotated in its closed position.

14. A car-top mountable rack for holding an elongated article such as a pair of skis, comprising at least a pair of units adapted to be positioned spaced apart from each other to cooperatively receive a said article, each unit including
   (a) a substantially planar base,
   (b) means for securing each said base to a substantially horizontal surface such as the top of a vehicle; and
   (c) means horizontally pivotally mounted on said base for receiving and securing therein a said article, comprising:

(i) a horizontally positioned member secured to said base to allow said member to pivot about a horizontal axis, (ii) at least a pair of spaced apart, parallel legs both mounted to the member and extending substantially normal thereto, (iii) at least upper and lower spaced apart support members secured to said legs and extending substantially parallel to said axis for receiving and supporting a said article therebetween when said legs are in a substantially vertical position and for wedging the article therebetween when the legs are pivoted into a more nearly horizontal position to prevent vertical movement of said article, and (iv) means on the end of at least one of said support members for restricting horizontal movement of a said article when said legs are so pivoted, said wedging and restricting action thereby in concert securing a said elongated article within said two spaced apart units of said rack, wherein said upper support member is open ended and is secured to each leg and extends substantially parallel to said axis for restricting upward movement of a said article received adjacent thereto and has affixed to the open end thereof and extending normal thereto a said horizontal movement restricting means, and wherein said lower support member is secured between said parallel legs for restricting downward movement of a said received article and has a said horizontal movement restricting means affixed to the end of the upper support member, such that when said assembly is in said vertical position both of said horizontal movement restricting means are horizontal and allow a said article to be received horizontally into position adjacent said leg, and when the assembly is pivoted to said nearly horizontal position and alternately extending horizontal movement restricting means will extend upward and downward to prevent horizontal movement thereof in both directions parallel to said axis.

15. A rack according to claim 14, wherein said base securing means comprises a permanent magnet assembly secured to said base and adapted to be magnetically attracted to a magnetic structure such as the top of a vehicle.

16. A rack according to claim 14, wherein each unit comprises a pair of spaced apart bases adapted to be secured at separate locations on opposite sides of a said surface, such as extending across the width of the top of a vehicle, and wherein said pivotally mounted means extends between said pair of bases and includes a plurality of parallel legs and associated support members for securing a plurality of articles therein, such as several pairs of skis.

17. A rack according to claim 14, wherein said pivotally mounted means, legs and upper and lower support members are formed of metal rods bent and welded together to form a rigid and light weight assembly.

18. A rack according to claim 14, wherein said horizontally positioned member and said lower support member are combined as a metal tube to which are secured a plurality of metal rods configured to form said legs, upper support member and horizontal movement restricting means.

* * * * *